United States Patent
Vajda et al.

(10) Patent No.: US 9,849,445 B2
(45) Date of Patent: Dec. 26, 2017

(54) SUBNANOMETER TO NANOMETER TRANSITION METAL CO OXIDATION CATALYSTS

(71) Applicants: Stefan Vajda, Lisle, IL (US); Alessandro Fortunelli, Los Angeles, CA (US); Hisato Yasumatsu, Ichikawa (JP)

(72) Inventors: Stefan Vajda, Lisle, IL (US); Alessandro Fortunelli, Los Angeles, CA (US); Hisato Yasumatsu, Ichikawa (JP)

(73) Assignee: UCHICAGO ARGONNE, LLC, Chicago, IL (US)

( * ) Notice: Subject to any disclaimer, the term of this patent is extended or adjusted under 35 U.S.C. 154(b) by 0 days.

(21) Appl. No.: 15/276,374

(22) Filed: Sep. 26, 2016

(65) Prior Publication Data
US 2017/0087538 A1    Mar. 30, 2017

Related U.S. Application Data
(60) Provisional application No. 62/233,887, filed on Sep. 28, 2015.

(51) Int. Cl.
*B01J 21/04* (2006.01)
*B01J 21/06* (2006.01)
(Continued)

(52) U.S. Cl.
CPC .......... *B01J 23/892* (2013.01); *B01D 53/864* (2013.01); *B01D 53/944* (2013.01); *B01J 21/04* (2013.01); *B01J 21/06* (2013.01); *B01J 23/42* (2013.01); *B01J 23/44* (2013.01); *B01J 23/462* (2013.01); *B01J 23/50* (2013.01); *B01J 23/52* (2013.01); *B01J 23/8913* (2013.01);
(Continued)

(58) Field of Classification Search
CPC ... B01J 21/04; B01J 21/06; B01J 23/42; B01J 23/44; B01J 23/46; B01J 23/50; B01J 23/52; B01J 23/56; B01J 23/66; B01J 23/8913; B01J 23/892
See application file for complete search history.

(56) References Cited

U.S. PATENT DOCUMENTS

| | | | | |
|---|---|---|---|---|
| 8,143,189 B2* | 3/2012 | Vajda | ....................... | B01J 23/50 502/300 |
| 8,148,293 B2* | 4/2012 | Vajda | ....................... | B01J 23/50 502/300 |
| 8,288,311 B2* | 10/2012 | Dhingra | ................... | B01J 23/52 502/243 |

OTHER PUBLICATIONS

Simon Bonanni, et al. "Effect of the TiO2 Reduction State on the Catalytic CO Oxidation on Deposited Size-Selected Pt Clusters," Journal of the American Chemical Society, 2012, 134, pp. 3445-3450.
(Continued)

*Primary Examiner* — Cam N. Nguyen
(74) *Attorney, Agent, or Firm* — Cherskov Flaynik & Gurda, LLC (57) ABSTRACT

The present invention provides a catalyst defined in part by a conductive substrate; a film overlaying a surface of the substrate; and a plurality of metal clusters supported by the layer, wherein each cluster comprises between 8 and 11 atoms. Further provided is a catalyst defined in part by a conductive substrate; a layer overlaying a surface of the substrate; and a plurality of metal clusters supported by the layer, wherein each cluster comprises at least two metals.

15 Claims, 4 Drawing Sheets

(51) Int. Cl.
*B01J 23/42* (2006.01)
*B01J 23/44* (2006.01)
*B01J 23/46* (2006.01)
*B01J 23/50* (2006.01)
*B01J 23/52* (2006.01)
*B01J 23/56* (2006.01)
*B01J 23/66* (2006.01)
*B01J 23/89* (2006.01)
*B01J 35/00* (2006.01)
*B01J 35/02* (2006.01)
*B01J 35/10* (2006.01)
*B01D 53/86* (2006.01)
*B01D 53/94* (2006.01)
*C01B 32/50* (2017.01)

(52) U.S. Cl.
CPC ........... *B01J 35/0013* (2013.01); *B01J 35/02* (2013.01); *B01J 35/10* (2013.01); *C01B 32/50* (2017.08); *B01D 2255/104* (2013.01); *B01D 2255/106* (2013.01); *B01D 2255/1021* (2013.01); *B01D 2255/1023* (2013.01); *B01D 2255/2092* (2013.01); *B01D 2255/20746* (2013.01); *B01D 2255/20753* (2013.01); *B01D 2255/30* (2013.01); *B01D 2255/9202* (2013.01)

(56) References Cited

OTHER PUBLICATIONS

William E. Kaden, et al., "Size-Dependent Oxygen Activation Efficiency over Pdn/TiO2(110) for the CO Oxidation Reaction," Journal American Chemical Society, 2010, 312, pp. 13097-13099.
R.A. Bennett, et al., "Pd nanoparticle enhanced re-oxidation of non-stoichiometric TiO2: STM imaging of spillover and a new form of SMSI," Catalysis Letters 59 (1999), pp. 99-105.
Akkarat Manasilp, et al., "Selective CO oxidation over Pt/alumina catalysts for fuel cell applications," Applied Catalysis BH: Environmental (2002), pp. 17-25.
Yoshihide Watanabe, et al., "Size-dependent catalytic activity and geometries of size-selected Pt clusters on TiO2 (110) surfaces," Catal. Sci. Technology, 2011, 1, pp. 1490-195.
H. Yasumatsu, "Generation of intense and cold beam of Pt—Ag bi-element cluster ions having single-composition," The European Physical Journal D, 63, (2011), pp. 195-200.
C. Yin, "Atomically precise (catalytic) particles synthesized by a novel cluster deposition instrument," The Journal of Chemical Physics, 140 (2014).

* cited by examiner

SUBNANOMETER TO NANOMETER TRANSITION METAL CO OXIDATION CATALYSTS

PRIORITY

This Utility Patent Application claims the benefit of U.S. Provisional Application No. 62/233,887, filed on Sep. 28, 2015, the entirety of which is incorporated herein by reference.

CONTRACTUAL ORIGIN OF THE INVENTION

The U.S. Government has rights in this invention pursuant to Contract No. DE-AC02-06H11357 between the U.S. Department of Energy and UChicago Argonne, LLC, representing Argonne National Laboratory.

BACKGROUND OF THE INVENTION

1. Field of the Invention

This invention is directed to a catalyst using subnanometer to nanometer sized clusters of atoms to facilitate chemical reactions, and more specifically, the invention is directed to a method for using all atoms within a catalyst cluster to efficiently convert reactants to desired product.

2. Background of the Invention

The catalytic oxidation of carbon monoxide (CO) to carbon dioxide ($CO_2$) is important in the automotive industry for pollution control and for the development of hydrogen fuel cells. In terms of pollution control, large amounts of carbon monoxide lead to the formation of ground level smog and ozone, which can cause respiratory problems for some people. In hydrogen fuel cells using a proton exchange membrane (PEM), carbon monoxide impairs the operation of the PEM at concentrations higher than 10 ppm. Platinum catalysts are used in these applications to remove carbon monoxide from the systems by transforming it into carbon dioxide, thus avoiding said pollution and PEM impairment issues.

Platinum is perhaps the best catalyst for the oxidation of CO. However, platinum is also very rare and, thus, relatively expensive compared to other catalyst metals, like silver or palladium. Accordingly, catalysts using platinum metal are also expensive.

Many conventional catalysts, such as might be found in a catalytic converter, use large deposits or films of platinum to facilitate the CO oxidation reaction. However, the films and deposits contain several platinum atoms in the interior of the bulk structure. These atoms do not participate in the oxidation reaction and, therefore, are wasted in the catalyst. By incorporating a large number of non-participating platinum atoms in the catalyst, the cost of the catalyst is needlessly increased.

In response, recent work has focused on catalytic nanoclusters as a means to reduce the amount of catalyst material necessary to facilitate certain reactions. Nevertheless, clusters of appropriate size and combinations of substrate and support material have not been identified to enhance the efficiency and cost-effectiveness of platinum catalysts for CO oxidation.

In order to lower the cost of oxidation catalysts, especially those using platinum, it is desirable to use the least amount of platinum possible while maintaining the highest level of reactivity. Thus, a need exists in the art for a catalyst with such properties.

SUMMARY OF THE INVENTION

An object of the present invention is to improve upon prior art platinum catalysts by reducing the amount of platinum necessary to make a highly reactive catalyst.

Another object of the present invention is to reduce the cost of platinum catalysts. A feature of the present invention is that ten atom clusters of platinum are deposited on the surface of the support. An advantage of the present invention is that the clusters make efficient use of the platinum by allowing a majority of the platinum atoms to be exposed to the surface for oxidation reactions while simultaneously allowing for its valence electrons to interact with the hydroxyl groups of the oxide support. This sharing of valency eliminates poisoning of the cluster metal with carbon monoxide. Surprisingly and unexpectedly, the inventors found that a cluster comprising 10 metal atoms prevents disaggregation of the cluster and subsequent loss of catalytic activity.

Still another object of the present invention is to reduce the amount of platinum used in catalyst clusters. A feature of the present invention is that the clusters only contain two or three atoms of platinum with eight or nine atoms of another metal, such as silver. An advantage of the present invention is that the cost of the catalyst is reduced by reducing the amount of platinum while the reactivity of the catalyst remains substantially unchanged. A further advantage of the present invention is that the two metals can facilitate different, yet complementary, aspects of the same oxidation reaction.

Yet another object of the present invention is that the turnover rate of the platinum catalyst is much higher than prior art catalysts under typical, in-situ pressures and temperatures. A feature of the present invention is that the platinum is deposited on top of an amorphous alumina thin film supported by a silicon wafer substrate. An advantage of the present invention is that the catalyst is manufactured using commonly available components and using standard manufacturing practices.

Still another object of the present invention is that catalyst efficiency is greatly increased. A feature of the present invention is that the catalyst surface area can be increased by increasing the surface roughness of the support layer or by incorporating a scaffolding material as part of the deposition of the catalyst or both. An advantage of the present invention is that the catalytic activity can be increased for a catalyst of a given size, or the size of the catalyst can be reduced without affecting the total amount of catalytic activity.

The present invention provides a catalyst (e.g., an electrocatalyst) comprising a substrate which may be conductive; a layer overlaying a surface of the substrate; and a plurality of metal clusters supported by the layer, wherein each cluster comprises between 8 and 11 atoms.

Additionally, the present invention provides a catalyst (e.g., an electrocatalyst) comprising a substrate, which may be conductive; a layer overlaying a surface of the substrate; and a plurality of metal clusters supported by the layer, wherein each cluster comprises at least two metals.

The invention also provides a method for oxidizing carbon monoxide, the method comprising contacting the carbon monoxide to a plurality of clusters of catalysts, wherein each cluster comprises between 8 and 12 metal atoms and wherein 90-100 percent of the atoms reside on the surface of each cluster.

BRIEF DESCRIPTION OF THE DRAWINGS

The invention together with the above and other objects and advantages will be best understood from the following detailed description of the preferred embodiment of the invention shown in the accompanying drawings, wherein.

DETAILED DESCRIPTION OF THE INVENTION

The foregoing summary, as well as the following detailed description of certain embodiments of the present invention, will be better understood when read in conjunction with the appended drawings.

As used herein, an element step recited in the singular and preceded with the word "a" or "an" should be understood as not excluding plural said elements or steps, unless such exclusion is explicitly stated. Furthermore, the references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

The present invention relates to catalysts having subnanometer (0.5 nm to 0.7 nm) to nanometer (nm) clusters of atoms to facilitate chemical reactions. In a specific embodiment of the present invention, ten atom clusters of platinum are deposited on a thin film of amorphous alumina with the alumina being supported by a silicon wafer substrate. In this embodiment, the silicon substrate defines a three dimensional scaffold, such that individual platinum atoms reposition themselves in situ to interact with carbon monoxide and other reactive moieties. One way in which the repositioning occurs is where the bonds between the individual platinum atoms and other atoms within the cluster (such as other platinum atoms or silver atoms), stretch as a result of the platinum atoms chemically reacting with the structure of the carbon monoxide. (One example of chemical interaction is when the platinum valence structure is attracted to the dipole moment defined by the carbonyl structure of the carbon monoxide.) This bond stretching results in the platinum atoms extending out past the periphery of its cluster so as to be fully exposed to the reactive moieties. These motions may lead to exchange of atoms in the structure as well. After interaction with the moieties, the bonds may contract.

In summary of this feature, the metal extends from its original position on the cluster and toward the carbon monoxide to a second position in response to the aforementioned chemical interaction with the carbon monoxide, and then contracts to its original position. The relatively fewer platinum atoms of the instant paradigm allow this bond stretching and contracting to occur practically without hinderance from nearby atoms thanks the high fluxionality (i.e., reversible deformation) of the cluster structure. Therefore, this reversible deformation feature eliminates any steric hinderance that otherwise would prevent the efficient chemical interaction between the metal atoms and the carbon monoxide.

In another embodiment of the present invention, the clusters of atoms are comprised of two or more constituents, such as platinum and silver.

Two specific embodiments of the invention utilize platinum clusters and mixed metal clusters to catalyze the carbon monoxide oxidation reaction.

Platinum Clusters

Figure 1A:
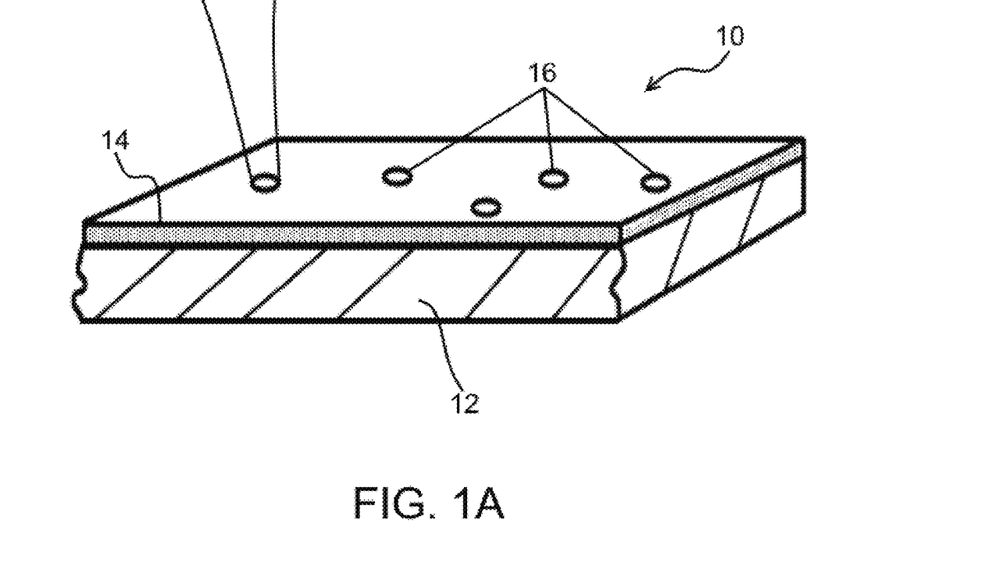
FIG. 1A is a schematic depiction of an catalyst in accordance with the features of the present invention.

FIG. 1A is a schematic view of the invention. The catalyst of the present invention, designated as numeral 10 is generally comprised of three components: a conductive or semi-conductive substrate 12, a film 14 overlaying the substrate 12, and the catalytic clusters 16. The substrate 12 in general can be an electrically conductive-, semi-conductive- or insulative substrate that serves as a support for the catalytic clusters. Accordingly, the substrate can be a variety of suitable materials, such as oxides (single or mixed), zeolites (the zeolites present as a powder, an extended surface such as a film, or as monoliths), and combinations thereof. Suitable oxides include alumina, magnesia, titania, zinc oxide, silica and combinations of thereof. Preferably, the substrate is a silicon chip or wafer.

The catalytic clusters can be deposited directly onto an ordered crystalline substrate, such that the substrate is relatively defect free and smooth. However, in an embodiment of the invention, catalytic clusters are implanted partially within or deposited onto the film 14. Thin films of some oxides such as alumina are amorphous and therefore can be highly porous. Surface roughness of about 0.3 nm $R_{ms}$ and larger are obtained, depending on preparation. Surface roughness between about 0.3 nm $R_{ms}$ and about 5 nm $R_{ms}$. are typical. This film porosity helps to bind and stabilize the clusters on the amorphous support, and in some instances may facilitate partial embedment of the cluster underneath the surface of the film. Also, due to the increased surface area defined by the amorphous structure, the number of cluster deposition sites also increases, such that some of the clusters may be deposited onto the walls, floors and other surfaces defining the cavities defined by the film. While these clusters may not be facing upwardly like the plurality of other clusters, they are nevertheless in fluid communication with the reactive fluids (e.g. gases, liquids, or combinations thereof) contacting the catalyst construct. In fact, these cavity-contained clusters may be facing sideways, or downwards but nevertheless still supported by the film. Enhanced reactivity occurs. It is preferable to deposit or grow such thin film 14 supports on the substrate prior to implantation of the catalytic clusters 16 onto the film and within the cavities and crevices defined by the film's surface.

The thin film can be deposited using such techniques as atomic layer deposition, sputter coating, electroplating, spin coating, chemical vapor deposition, and electrospray deposition, among others. Additionally, the film can be grown on the substrate. For instance, using an NiAl intermetallic substrate, a highly ordered layer of alumina can be grown on the surface of the substrate by flowing oxygen gas over a prepared surface of NiAl under ultra-high vacuum conditions. Suitable support substrates are of the types described supra.

In an embodiment of the invention, the thin film support 14 for the platinum clusters is preferably a thin film oxide. More preferably, the thin film oxide is alumina ($Al_2O_3$) inasmuch as alumina has excellent properties for immobilizing nanometer and subnanometer sized clusters. Such thin film alumina is amorphous, which embodies high surface area surfaces, as discussed supra. The thickness of the thin film is between about 0.5 nm and about 3 nm. Preferably the thin film has a thickness of three monolayers (approximately 0.7 nm). When using an insulator as a support material, thin films (less than about 3 nm), especially ultra-thin films (less than about 1 nm), are preferable to thicker films. Thinner films avoid charge accumulation on the catalyst surface and also promote electron/charge transfer to/from the catalyst to improve performance.

Thin film cluster-support surfaces, which are conductive, allow the use of charged particles in the fabrication of the catalysts. Specifically, it allows the Pt atoms at the surface of the cluster to be in electric communication with moieties (e.g. oxygen) of the oxide support. This Pt-surface oxygen interaction provides a means for preventing poisoning of the metal with carbon monoxide. Surprisingly and unexpectedly, the inventors found the aforementioned Pt-surface oxygen interaction to be optimized with clusters comprising 10 platinum atoms (Pt10). The electronic and physical configuration of Pt10 clusters prevents disaggregation of the cluster and consequent loss of catalytic activity. In summary of this point, some of the platinum atoms interact with the reaction fluid (e.g., CO gas) while others interact with the oxygen on the oxide support.

The catalytic clusters 16 are deposited on the thin film support using a molecular beam. (Clusters comprising solely Pt, or a mix of Pt and Ag are suitable.) The molecular beam of platinum clusters is generated by laser evaporation of a rotating platinum rod using helium as carrier gas. The beam of positively charged platinum clusters is guided using an assembly of ion optics and a quadrupole mass filter into the deposition chamber. The quadrupole mass filter ensures that the clusters in the beam are within a narrow size distribution of between eight and twelve atoms (typically ten atom clusters). As such, these clusters are usually less than about 0.8 nm in diameter on the support. Atom numbers outside that range are swept from the beam path and recycled for later deposition. The size-selected platinum clusters are soft-landed (i.e., intact ions are deposited on a surface at low kinetic energies) on the thin film substrate. As stated supra, alumina is an excellent material for immobilizing the clusters on the catalyst surface and in cavities contiguous with the surface.

Figure 1B:
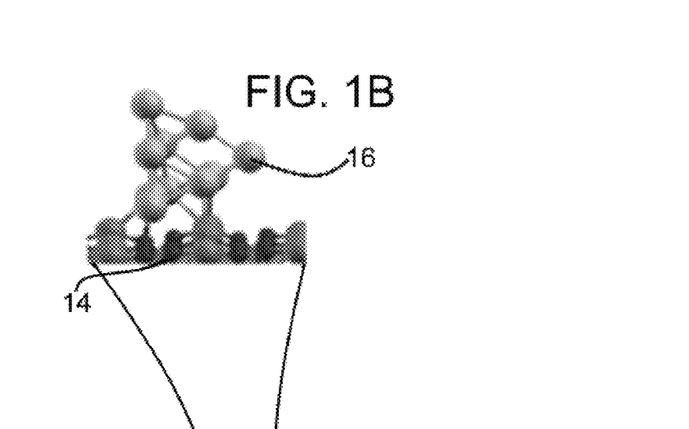
FIG. 1B is a schematic representation of the three dimensional atomic structure of the nanoclusters in accordance with features of the present invention.

As can be seen in FIG. 1B, the platinum nanoclusters deposited on the silicon wafer with the amorphous alumina support assumed three-dimensional, tetrahedral configurations. By comparison, platinum nanoclusters deposited on NiAl intermetallic with a highly ordered alumina support layer were flat or planar configurations. However, upon exposing the highly ordered support to operation conditions (temperatures, reactants, etc), the alumina converted to an amorphous structure and the planar clusters reconfigured into three-dimensional structures.

Spacing of the clusters is important in order to prevent agglomeration of the nanoclusters. If the nanoclusters are deposited too close together, then the clusters are at risk of aggregating. This will increase the amount of platinum atoms in the bulk, reducing the amount of platinum atoms that actually participate in the catalytic reaction. Accordingly, a minimum distance of about 2 nm between clusters is recommended to prevent agglomeration. A myriad of techniques for providing this cluster density are available, including that found in the inventor's U.S. patent application Ser. No. 13/862,116, filed on Apr. 12, 2013, the entirety of which is incorporated herein by reference. Agglomeration can be further prevented if the clusters are originally deposited at different levels on the same support substrate so long as one cluster does not reside directly above an inferiorly disposed one on a continuous support surface. An exception to this is when clusters reside in cavities partially overlaid by clusters not in cavities.

Notwithstanding the foregoing, if the clusters are spaced too far apart, (e.g. a low catalyst loading) then the overall catalytic rate will decrease. Thus, a maximum spacing of about 50 nm is recommended to maintain a high catalytic rate. In the present invention, aggregation of the nanoclusters was avoided by depositing the equivalent of 0.05 atomic monolayers of Pt(111) to each spot of the support layer upon which the beam was directed. Deposition was monitored using a pico-amperometer.

Neat Pt Cluster
Testing Detail

Using the preferred embodiment, so depicted in FIG. 1 (that embodiment being a silicon substrate 12, amorphous alumina ultra-thin film 14, and ten atom platinum clusters 16), the inventors tested the catalyst under temperature programmed reactions. It should be noted that this testing detail is not a limitation on the capacity of the catalyst. Generally, fluids with CO concentrations of between about 1 part per million (ppm) and about 20 percent can be treated with the invented catalyst and with the invented method. Also, depending on the CO concentrations, flow rates and pressures can also vary, with pressures ranging from close to high vacuum up to many atmospheres. Pressure values of from about $10^{-8}$ to 7600 torr are suitable. It should be noted that the invented catalysts also work in liquid phase, which may or may be pressurized to facilitate removal of CO traces.

Testing was performed in a fixed-bed, continuous flow reactor using a gas mixture of carbon monoxide, oxygen, and helium ($1CO:1O_2:98He$). The gas had a flow rate of about 30 sccm (standard cubic centimeters per minute), and pressure inside the reactor was maintained at about 800 Torr. The catalyst sample was then heated at a rate of 10° C./min up to 300° C. For each 50° C. increment between 100° C. and 300° C., the sample was held for thirty minutes.

During the temperature programmed reactions, the inventors monitored the CO entering the reactor and the $CO_2$ exiting the reactor. The number of molecules of CO that were converted into $CO_2$ per second is referred to as the turn-over rate (TOR). (TOR is related to the total number of catalytic atoms used in the conversions.)

Figure 2:
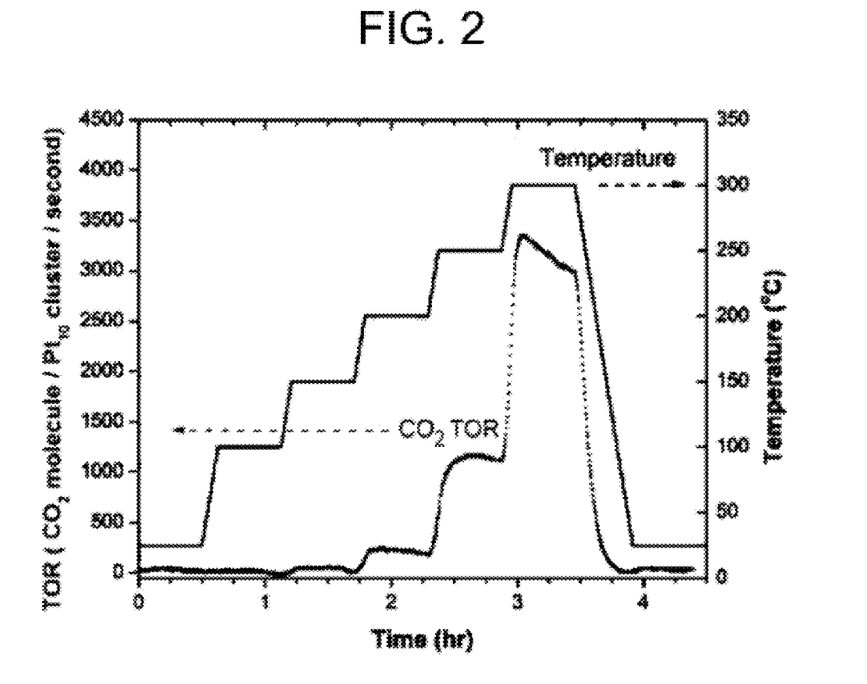
FIG. 2 depicts a graph of the platinum cluster catalyst turnover rate (TOR) as a function of temperature, in accordance with features of the present invention.

As can be seen in the graph in FIG. 2, the inventors were able to achieve TOR of 3360 molecules of carbon monoxide per each $Pt_{10}$ cluster per second at a temperature of 300° C. Thus, on a per atom basis the TOR is 336, which is at least fifteen times higher than any other reported rate for carbon monoxide oxidation reactions, including reported rates for other platinum and platinum alloy catalysts, gold catalysts, ruthenium catalysts, manganese oxide catalysts, and palladium catalysts.

Mixed Alloy Clusters

Besides pure platinum clusters, the present invention provides clusters comprising a mixture of metals, wherein one of the metals serves as a highly reactive catalytic center, while other of the metals are relatively less reactive and serve to support the catalytic centers. In effect, the less reactive metals dilute the concentration of the catalytic centers while simultaneously enhancing exposure of the centers to moieties targeted for transformation. In these paradigms, two or more metals comprise the clusters.

Figure 3A:
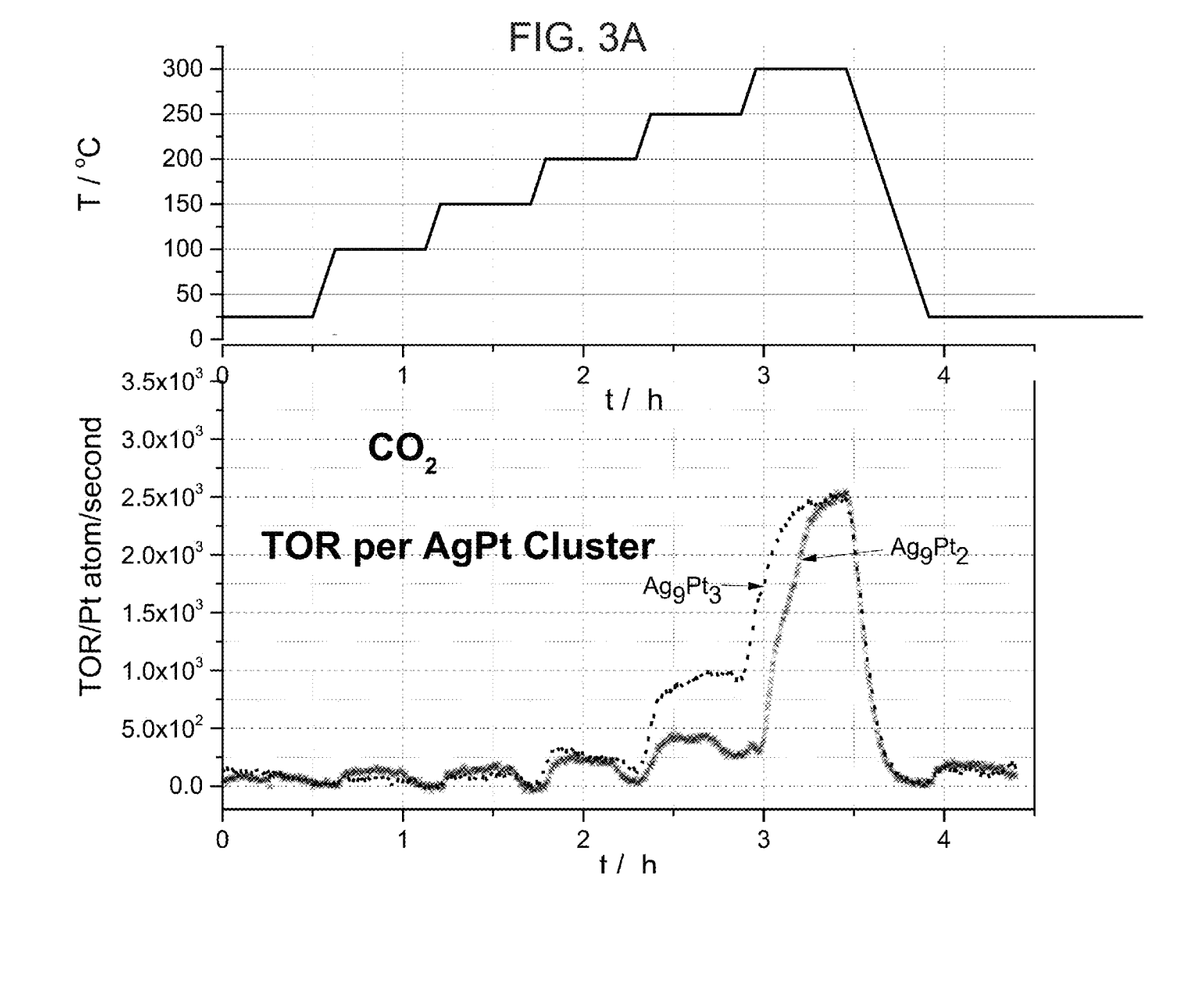
FIG. 3A depicts a graph of the mixed platinum-silver catalyst cluster turnover rate (TOR) as a function of temperature, in accordance with features of the present invention.

One embodiment of a mixed alloy catalytic cluster is an alloy comprising platinum and silver for use in carbon monoxide oxidation reactions. In this embodiment, most of the clusters comprise the less expensive metal (e.g. between 6 and 9 silver atoms compared to between 2 and 3 platinum atoms). In the data set displayed in FIG. 3A, one embodiment of the clusters contain nine silver atoms and two or three platinum atoms. These multi-element element clusters perform complementary functions during carbon monoxide oxidation. The silver atoms adsorb oxygen at a high rate, thereby creating a cache of loosely bound but already activated, oxygen molecules from the atmosphere or else dosed into the system. Simultaneously, the platinum atoms strongly bind and activate the carbon monoxide. In each of these two constructs, the loosely bound oxygen molecules are in close spatial and energetic relationship to the bound carbon monoxide. This allows the carbon monoxide oxidation to proceed rapidly to carbon dioxide via the Langmuir-Hinshelwood mechanism, boosting the TOR near to the rates of pure platinum and much higher than silver's rate alone.

In summary of this point, the per cluster activity of the mixed AgPt clusters show similar (no more than 10 percent lower) activity as pure platinum clusters.

Figure 3B:
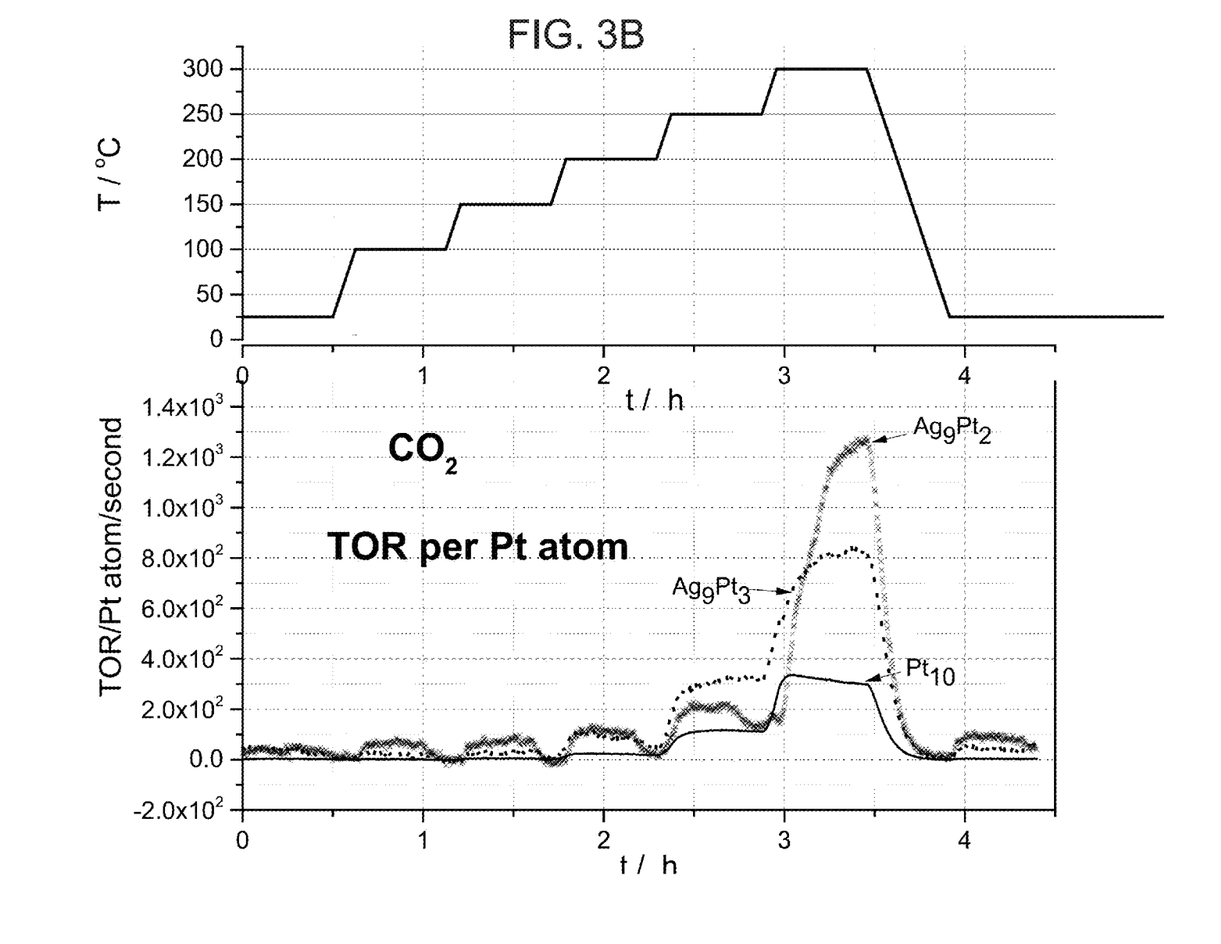
FIG. 3B depicts a graph of pure platinum and mixed platinum-silver catalyst cluster TOR per platinum atom as a function of temperature, in accordance with features of the present invention.

At 300° C., the TOR for the silver-platinum clusters is approximately 2500 (e.g., between about 900 and about 1300 per platinum atom, which is 3-4 times the TOR of Pt in a pure Pt cluster). Put another way, the mixed metal clusters deliver the same TOR with a 3-4 fold lower Pt lowering compared to pure Pt clusters. The pure Pt atom TOR as a function of temperature can be seen in the graph of FIG. 3B. As shown above, platinum could be used alone, but it is much more expensive. Silver used alone, however, would be quickly poisoned with oxygen, nor would it bind and activate CO efficiently. Nevertheless, the combination of a larger amount of silver compared to a relatively smaller amount of platinum, both confined in an ultra-small cluster (e.g., approximately 0.7 nm in diameter) provides an adequate TOR, while vastly decreasing the cost of the catalyst as compared to a pure platinum catalyst.

In the platinum-silver example given above, the mixed alloy clusters allow for efficient use of platinum in the catalyst. Instead of platinum atoms being isolated within the interior of the cluster, the silver atoms provide the bulk of the cluster (e.g., the silver will comprise between about 60 weight percent and about 75 weight percent of the cluster).

Platinum and silver both have the face-centered cubic structure, and at 18 to 25 atomic percent of platinum, they form a solid solution. However, due to platinum's surface energy and interaction with CO, and because clusters are small in size, the platinum atoms will migrate to the surface of the cluster where the surface energy makes its position energetically more favorable. Ultra small (as defined supra) clusters will force some of the platinum atoms to reside on the surface of the cluster, where they continue to exhibit exception catalytic activity. Generally, in a 10 atom cluster, typically most of the atoms are on the surface such that no atom is insulated from the exterior of the cluster. Thus, there is no concern that the platinum atoms will be in the interior bulk, not participating in the oxidation reaction.

Additional atoms can be added to the mixed alloy cluster to provide further complementary functions. For instance, one or two cobalt and/or nickel atoms in the cluster help to secure the cluster to the support. This is because these added metals bind very strongly to the oxygen moieties comprising the surface of the support. (e.g. as part of hydroxyl groups).

Other potential combinations of atoms include Au—Ag and AuPt. Other compositions may contain Ag, Co, Cu, Pd, Rh, Ru, and combinations thereof.

The mixed alloy clusters can be deposited on the catalyst surface in a variety of ways. For instance, the mixed alloy clusters can be deposited via the molecular beam method as described above. In this instance, the beam would be generated from laser evaporation of a rotating rod of the alloy metal (e.g., 18-25 at % Pt, 75-82 at % Ag), or sputtered by bombardment of a Pt—Ag alloy. The clusters also could be deposited using atomic layer deposition with stoichiometric amounts of platinum and silver precursor. In still another way, the more abundant element is first deposited as a film, and then the adatom is electrosprayed onto the film surface. In the silver-platinum example, a silver film would be deposited first and the platinum would be electrosprayed onto the silver film. Other suitable deposition techniques include 3D printing, physical vapor deposition (PVD), chemical vapor deposition (CVD), atomic layer deposition (ALD), wet impregnation, electrodeposition, precipitation, and combinations thereof.

Catalytic performance can also be enhanced further by increasing the surface area of the catalyst exposed to the reactants. In one embodiment, surface area is increased by increasing the surface roughness of the support film or layer. Suitable surface area roughness measurements are between about 0.3 nm $R_{rms}$ and about 5 nm $R_{rms}$. Using the deposition techniques already mentioned, the surface area roughness can be easily be manipulated. By increasing the surface area within the boundaries of the support material, more room is created for the deposition of nanoclusters. Thus, more molecules of CO can be turned over for a catalyst of a given size, or the size of the catalyst can be reduced without decreasing the turnover rate.

Another way to enhance the catalyst efficiency is to scaffold the atoms in three dimensions. The term "scaffold" means that a less expensive material is deposited in such a way as to maximize the available space for deposition of the more expensive, more active catalyst species. Scaffolding in three dimensions creates active sites not only on exterior surfaces of the catalyst surface but with on the surfaces define the nooks and crannies of the pores and crevices the scaffolding now provides. The scaffolding can be accomplished through manipulation of the surface roughness of the support film or layer. For instance, peaks and valleys having high aspect ratios are developed in the support layer. In an embodiment of the invention, the scaffold is defined by the surface roughness of a film or layer comprised of an amorphous material such that the layer has a surface roughness of between about 0.3 nm $R_{rms}$ and about 5 nm $R_{rms}$. The platinum or mixed metal nanoclusters are then deposited within this scaffolding, thereby exposing a multitude of crystallographic planes to moieties within the reactant fluids.

Generally, scaffolding can be created using a separate scaffolding material, such as nanotubes, nanorods, crystal matrices, high surface area amorphous films, and combinations thereof. Examples of 3-D nanostructures include carbon, silicon, boron nitride, and titanium dioxide nanotubes, anodic aluminum oxide, and other oxide nanorods and nanotubes. In some instances, the scaffolding material can be grown from the support layer or the substrate, followed by deposition of the nanoclusters. In other instances, the scaffolding material is deposited onto the support layer or substrate followed by deposition of the nanoclusters. In still other instances, the nanoclusters are first deposited on the scaffolding material, and then the combination of scaffolding material and nanoclusters is deposited on the support layer or substrate.

Additionally, for mixed metal clusters, the less expensive, filler metal can be used as the scaffold for the more expensive, more active metal catalyst. Using the afore-described scaffolding techniques increases the surface area available for catalytic reactions. The scaffolding can also create flow through channels, depressions, and other atomic networks that encourage and enhance adsorption of the reactants.

By identifying the ideal cluster size of platinum atoms, reducing the amount of rare and expensive catalyst atoms necessary in mixed metal clusters, and enhancing the surface characteristics of the catalyst, the present invention reduces the cost and increases the efficiency of catalyst.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting, but are instead exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the terms "comprising" and "wherein." Moreover, in the following claims, the terms "first," "second," and "third," are used merely as labels, and are not intended to impose numerical requirements on their objects. Further, the limitations of the following claims are not written in means-plus-function format and are not intended to be interpreted based on 35 U.S.C. §112(f) unless and until such claim limitations expressly use the phrase "means for" followed by a statement of function void of further structure.

The present methods can involve any or all of the steps or conditions discussed above in various combinations, as desired. Accordingly, it will be readily apparent to the skilled artisan that in some of the disclosed methods certain steps can be deleted or additional steps performed without affecting the viability of the methods.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," "more than" and the like include the number recited and refer to ranges which can be subsequently broken down into subranges as discussed above. In the same manner, all ratios disclosed herein also include all subratios falling within the broader ratio.

One skilled in the art will also readily recognize that where members are grouped together in a common manner, such as in a Markush group, the present invention encompasses not only the entire group listed as a whole, but each member of the group individually and all possible subgroups of the main group. Accordingly, for all purposes, the present invention encompasses not only the main group, but also the main group absent one or more of the group members. The present invention also envisages the explicit exclusion of one or more of any of the group members in the claimed invention.

A property right or privilege is claimed in the invention as defined by the following claims:

1. A catalyst comprising:
a support substrate;
a film overlaying a surface of the substrate; and
a plurality of metal clusters supported by a three dimensional scaffold on the surface of the film, wherein each cluster comprises between 8 and 12 atoms.

2. The catalyst of claim 1, wherein the substrate is silicon, the film is alumina and the metal is platinum.

3. The catalyst of claim 1, wherein the three dimensional scaffold on the surface of the film is a surface roughness of the film of approximately 0.3 nm $R_{rms}$ and higher.

4. The catalyst of claim 3, wherein the film comprises an amorphous material.

5. The catalyst of claim 1, wherein the film is between approximately 0.3 nm and approximately 5 nm thick.

6. The catalyst of claim 1, wherein the film is selected from the group consisting of amorphous alumina, ordered alumina crystal, and combinations thereof.

7. The catalyst of claim 1, wherein some of the atoms reside in different planes from each other.

8. The catalyst of claim 1, wherein the scaffold is a structure selected from the group consisting of nanotubes, nanorods, crystal matrices, surfaces of amorphous films, and combinations thereof.

9. The catalyst of claim 1 wherein each cluster comprises at least two metals.

10. The catalyst of claim 9, wherein each of the at least two metals are selected from the group consisting of platinum, silver, gold, cobalt, palladium, ruthenium, nickel, gold, thodium, and combinations thereof.

11. The catalyst of claim 9 wherein the scaffold is built from one metal of the at least two metals.

12. The catalyst of claim 1, wherein each cluster comprises platinum and silver.

13. The catalyst of claim 12, wherein each cluster comprises from two to three atoms of platinum and nine atoms of silver.

14. The catalyst of claim 13, wherein each cluster of atoms further contains cobalt, or nickel, or both cobalt and nickel.

15. The catalyst of claim 1, wherein the clusters are deposited on a 3-D structure defined by the film.

* * * * *